United States Patent
Tang

(10) Patent No.: US 11,683,755 B2
(45) Date of Patent: Jun. 20, 2023

(54) BANDWIDTH PART (BWP) SWITCHING WITH DISCONTINUOUS RECEPTION (DRX) IN 5G WIRELESS COMMUNICATION SYSTEMS

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/828,752

(22) Filed: Mar. 24, 2020

(65) Prior Publication Data
US 2020/0229089 A1    Jul. 16, 2020

Related U.S. Application Data

(63) Continuation of application No. PCT/CN2018/107821, filed on Sep. 27, 2018.

(30) Foreign Application Priority Data

Sep. 27, 2017    (WO) .............. PCT/CN2017/103704

(51) Int. Cl.
*H04W 52/02*    (2009.01)
*H04W 72/04*    (2023.01)

(52) U.S. Cl.
CPC ....... *H04W 52/0225* (2013.01); *H04W 72/04* (2013.01)

(58) Field of Classification Search
CPC ............. H04W 52/0225; H04W 72/04; H04W 72/0453; H04W 24/04; H04L 5/0098
See application file for complete search history.

(56) References Cited

U.S. PATENT DOCUMENTS

| | | | |
|---|---|---|---|
| 2011/0292915 A1 | 12/2011 | Prakash et al. | |
| 2017/0064770 A1* | 3/2017 | Patwardhan | H04W 76/28 |
| 2017/0111860 A1 | 4/2017 | Ang et al. | |
| 2017/0265248 A1 | 9/2017 | Narasimha et al. | |
| 2018/0352511 A1* | 12/2018 | Martin | H04W 52/0216 |
| 2020/0245295 A1* | 7/2020 | Kimba Dit Adamou | H04W 24/04 |

(Continued)

FOREIGN PATENT DOCUMENTS

| CN | 1842198 A | 10/2006 |
|---|---|---|
| CN | 101296484 A | 10/2008 |
| CN | 101965037 A | 2/2011 |

(Continued)

OTHER PUBLICATIONS

English Translation of (CN 201710687303.9) (Year: 2017).*

(Continued)

*Primary Examiner* — Rushil Parimal Sampat
(74) *Attorney, Agent, or Firm* — Bayes PLLC

(57) ABSTRACT

The present disclosure discloses a bandwidth part switching method, a terminal device, and a computer storage medium. The method includes: obtaining a timer; and determining, based on the timer, whether to switch from a currently activated first bandwidth part (BWP) to a second BWP, where the first BWP is not the second BWP.

8 Claims, 2 Drawing Sheets

(56) References Cited

U.S. PATENT DOCUMENTS

2021/0076448 A1* 3/2021 Koskela ............... H04B 7/0617

FOREIGN PATENT DOCUMENTS

| CN | 102036347 A | 4/2011 |
|---|---|---|
| CN | 103313331 A | 9/2013 |
| CN | 106131909 A | 11/2016 |
| CN | 107078890 A | 8/2017 |
| CN | 107113725 A | 8/2017 |
| CN | 107493605 A | 12/2017 |
| CN | 08496385 A | 9/2018 |
| CN | 108496385 A | 9/2018 |
| CN | 108521850 A | 9/2018 |
| RU | 2628568 C2 | 8/2017 |

OTHER PUBLICATIONS

CN 109391985A_Original_Document (Year: 2019).*
WO 2017/076610 A1 (Year: 2017).*
Guangdong OPPO Mobile Telecommunmications Corp. Ltd., International Search Report and Written Opinion, PCTCN2018/107821, dated Dec. 29, 2018, 10 pgs.—No Translation Available.
Guangdong OPPO Mobile Telecommunmications Corp. Ltd., International Search Report and Written Opinion, PCTCN2017/103704, dated Jun. 15, 2018, 8 pgs.
Panasonic, Combining DRX with BWP adaptation, 3GPP TSG-RAN WG1 Meeting #90, R1-1713976, Aug. 25, 2017, 4 pgs.
Samsung, On Bandwidth Part Operation, 3GPP TSG RAN WG1 NR Ad-Hoc#3, R1-1716019, Sep. 21, 2017, 5 pgs.
Guangdong OPPO Mobile Telecommunications Corp. Ltd., Extended European Search Report, EP18860821.0, dated Nov. 9, 2020, 10 pgs.
Interdigital, Inc., Remaining details of BWP, 3GPP TSG RAN WG1 Meeting AH_NR#3, R1-1716258, Nagoya, Japan, Sep. 18-21, 2017, 6 pgs.
RAN WG1, LS on Bandwidth Part Operation in NR, 3GPP TSG RAN WG2#99, R2-1707624, Berlin, Germany, Aug. 21-25, 2017, 3 pgs.
Vivo, Remaining details for bandwidth part operation, 3GPP TSG RAN WG1 NR AH#3, R1-1715648, Nagoya, Japan, Sep. 18-21, 2017, 3 pgs.
First Office action issued in corresponding India Application No. 202017016932, dated Jun. 21, 2021, 6 page.
Second Office action issued in corresponding Chinese Application No. 202010058375.9, dated Jul. 16, 2021, 12 pages.
"Impact of Bandwidth Part Activation/Deactivation on DRX", Agenda Item: 10.3.1.10, Source: InterDigital, 3GPP TSG-RAN WG2 #99, R2-1708731, Berlin, Germany, Aug. 21-25, 2017, 2 pages.
First Office action issued in corresponding Chinese Application No. 202010058375.9, dated Apr. 19, 2021, 12 page.
First Office action issued in corresponding Canadian Application No. 3,077,135, dated May 5, 2021, 5 page.
Second Office action issued in corresponding India Application No. 202017016932, dated Jun. 21, 2021, 6 page.
Third Office action issued in corresponding Chinese Application No. 202010058375.9, dated Oct. 28, 2021, 10 pages.
First Office action issued in corresponding Singapore Application No. 11202002870Y, dated Nov. 2, 2021, 11 pages.
First Office action issued in corresponding Taiwanese Application No. 107133624, dated Sep. 30, 2021, 4 pages.
Decision of Rejection issued in corresponding Chinese Application No. 202010058375.9, dated Feb. 16, 2022, 11 pages.
First Office action issued in corresponding Russian Application No. 2020114362, dated Dec. 24, 2021, 11 pages.

* cited by examiner

BANDWIDTH PART (BWP) SWITCHING WITH DISCONTINUOUS RECEPTION (DRX) IN 5G WIRELESS COMMUNICATION SYSTEMS

CROSS-REFERENCE TO RELATED APPLICATION

This application is a continuation application of PCT Patent Application No. PCT/CN2018/107821, entitled "METHOD FOR SWITCHING BANDWIDTH PARTS, TERMINAL DEVICE, AND COMPUTER STORAGE MEDIUM" filed on Sep. 27, 2018, which claims priority to PCT Patent Application No. PCT/CN2017/103704, entitled "BANDWIDTH PART SWITCHING METHOD, TERMINAL DEVICE, AND COMPUTER STORAGE MEDIUM" filed on Sep. 27, 2017, all of which are incorporated by reference in their entirety.

BACKGROUND

Technical Field

The present invention relates to the field of information processing technologies, and in particular, to a bandwidth part switching method, a terminal device, and a computer storage medium.

Related Art

A bandwidth part (BWP) is a concept in a frequency-domain dimension. In current discussions, it is assumed that a terminal device supports only one activated BWP at onetime point. Said activated means that the terminal device is expected to receive a signal on a bandwidth stipulated by the BWP. However, no specific processing solution is provided at present for how to control a terminal device to perform BWP switching.

SUMMARY

To resolve the foregoing technical problem, embodiments of the present invention provide a bandwidth part switching method, a terminal device, and a computer storage medium.

An embodiment of the present invention provides a bandwidth part switching method, applied to a terminal device. The method includes:
obtaining a timer; and
determining, based on the timer, whether to switch from a currently activated first bandwidth part BWP to a second MVP, where the first BWP is not the second BWP.

In the foregoing solution, the obtaining a timer includes:
obtaining the configured for the terminal device by a network side.

In the foregoing solution, the method further includes:
determining, based on a discontinuous reception DRX state of the terminal device and a long DRX cycle, whether to start the timer.

In the foregoing solution, the determining, based on a DRX state of the terminal device and a long DRX cycle, whether to start the timer includes:
determining to start the timer when duration within which the DRX state of the terminal device is in the long DRX cycle is longer than a preset duration.

In the foregoing solution, the determining, based on a DRX state of the terminal device and a long DRX cycle, whether to start the timer includes:
determining to start the timer when a quantity of long DRX cycles that the DRX state of the terminal device is in is greater than a preset quantity.

In the foregoing solution, the determining, based on the timer, whether to switch from a currently activated first bandwidth part BWP to a second BWP includes:
determining to switch from the currently activated first BWP to the second BWP if the timer expires.

An embodiment of the present invention provides a terminal device, including:
an information obtaining unit, configured to obtain a timer; and
a processing unit, configured to determine, based on the timer, whether to switch from a currently activated first bandwidth part BWP to a second BWP, where the first BWP is not the second BWP.

In the foregoing solution, the information obtaining unit obtains the timer configured for the terminal device by a network side.

In the foregoing solution, the processing unit determines, based on a discontinuous reception DRX state of the terminal device and a long DRX cycle, whether to start the timer.

In the foregoing solution, the processing unit determines to start the timer when duration within which the DRX state of the terminal device is in the long DRX cycle is longer than a preset duration.

In the foregoing solution, the processing unit determines to start the timer when a quantity of long DRX cycles that the DRX state of the terminal device is in is greater than a preset quantity.

In the foregoing solution, the processing unit determines to switch from the currently activated first BWP to the second BWP if the timer expires.

An embodiment of the present invention provides a terminal device, including a processor and a memory configured to store a computer program that can be run by the processor.

The processor is configured to perform, when running the computer program, steps of the method.

An embodiment of the present invention provides a computer storage medium storing a computer executable instruction. When being executed, the computer executable instruction implements the steps of the foregoing method.

In the technical solution of the embodiments of the present invention, the timer is used to control whether to switch from a BWP to activation of another BWP. In this way, BWP switching is implemented, transmission of control information on a network side can be reduced as much as possible, thereby ensuring processing efficiency.

DETAILED DESCRIPTION

Figure 1:
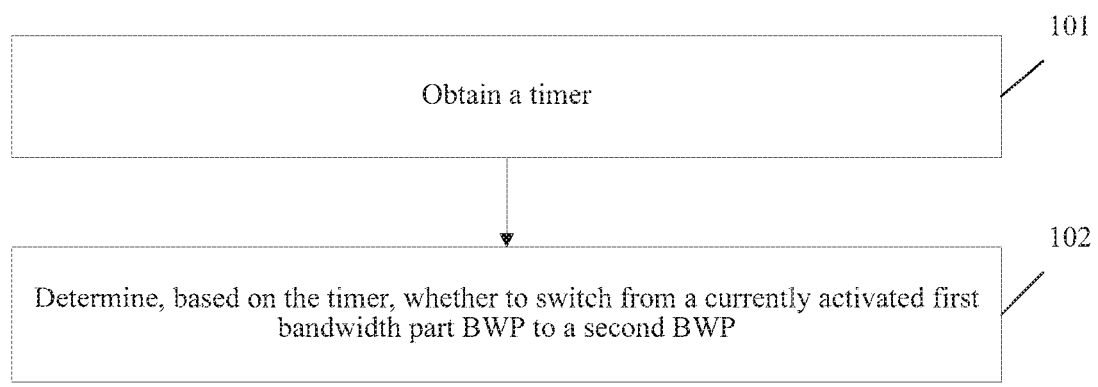
FIG. 1 is a schematic flowchart of a bandwidth part switching method according to an embodiment of the present invention.

To better understand the features and technical content of the embodiments of the present invention, the implementation of the embodiments of the present invention is described below in detail with reference to the accompanying drawings. The accompanying drawings are provided for reference only, and are not intended to limit the embodiments of the present invention.

In an LTE system, a terminal device can support a maximum system bandwidth of 20 MHz. In a new radio (NR) system, some terminal devices may not necessarily support a system bandwidth within all frequency ranges. Therefore, if a terminal device supports only one activated BWP at onetime point, the terminal device needs to be controlled to perform BWP switching.

Embodiment 1

This embodiment of the present invention provides a bandwidth part (BWP) switching method, applied to a terminal device. The method includes the following steps:

Step 101: Obtain a timer.

Step 102: Determine, based on the timer, whether to switch from a currently activated first bandwidth part BWP to a second BWP, where the first BWP is not the second BWP.

The BWP herein mainly includes three parameters: numerology, used to indicate a basic parameter set and a subcarrier spacing SCS; a center frequency; and a bandwidth, which is less than or equal to a maximum system bandwidth.

It can be learned from this that the BWP is a concept in a frequency-domain dimension. In current discussions, it is assumed that a terminal device supports only one activated BWP at onetime point. Said activated means that the terminal device is expected to receive a signal on a bandwidth stipulated by the BWP, including data transmission (uplink and downlink transmission) and a system message.

In step 101, the obtaining a timer may be obtaining a default timer of the terminal device or a timer configured for the terminal device by a user, and certainly may include: obtaining the timer configured for the terminal device by a network side.

The configuring, by a network side, the timer for the terminal device may be: configuring, by the network side, the timer for the terminal device when it is determined that the terminal device supports only a part of a bandwidth, or that the terminal device uses a BWP for communication. In addition, the network side may configure a same timer or different timers for different terminal devices, and may perform determining based on a type of a service to be executed by the terminal device. For example, a wide BWP may be configured when the service needing to be executed by the terminal device has a relatively high transmission rate or the service has relatively much transmission data. The type of the service can be determined based on parameters such as QoS. It should be understood that another manner of determining the BWP may exist as well, and is not enumerated in this embodiment.

A function of the timer includes: determining, after the timer is started and when the timer is stopped, to perform an operation of switching from the currently activated first bandwidth part BWP to the second BWP. That is, the terminal device determines, according to the configured timer, whether to switch from a currently activated bandwidth part (BWP) to another configured bandwidth part.

In addition, before step 102 is performed, the method provided in this embodiment further includes: determining whether to start the timer.

A method for determining whether to start the timer may further include one of the following steps:

starting the timer when the terminal device transmits a physical uplink shared channel (PUSCH);

starting the timer when radio resource control (RRC) signaling is transmitted;

starting the timer when the terminal device initiates random access successfully.

starting the timer when downlink control information is received and uplink and downlink transmission is scheduled by using the downlink control information, where the downlink control information may be DCI; and starting the timer when the terminal device sends or receives data on a resource configured for the terminal device by the network side.

In step 102, the determining, based on the timer, whether to switch from a currently activated first bandwidth part BWP to a second BWP includes: determining to switch from the currently activated first BWP to the second BWP if the timer expires. The second BWP may also be a BWP configured for the terminal device by the network side. The second BWP may be the same as or different from the first BWP. For example, the second BWP and the first BWP may have a same frequency and bandwidth, or different frequencies but a same bandwidth, or a same frequency but different bandwidths, or different frequencies and bandwidths. Alternatively, the second BWP and the first BWP may have a same frequency and bandwidth, but the two BWPs correspond to different basic parameter sets (numerology).

That is, when the terminal device uses a BWP to transmit a service, resources may be wasted if no service data is sent or received within a relatively long time. Therefore, according to the solution provided by this embodiment, a timer for the BWP is added, so that BWP switching is performed if the timer expires. For example, when the first BWP has a relatively large bandwidth, resources may be wasted if no service data is transmitted within a long time. Through controlling the timer, the terminal device can switch to another BWP, thereby avoiding a transmission resource waste caused by the network side instructing the terminal device to switch the BWP, and preventing the terminal device from occupying a bandwidth resource for a long time.

In addition, the determining whether to start the timer may be combined with a DRX state for subsequent processing. For example, whether to start the timer is determined based on duration of the discontinuous reception (DRX) state of the terminal device and a long DRX cycle.

The DRX state of the terminal device may be configured for the terminal device by the network side, so that UE does not need to enter an idle mode when there is no data to transmit, and still remains synchronization with a base station.

Specifically, the determining, based on the DRX state, whether to start the timer may include the following two manners:

Manner 1: Determine to start the timer when the duration within which the DRX state of the terminal device is in the long DRX cycle is longer than a preset duration.

In this manner, a start condition of the timer depends on duration within which currently configured DRX is in the long DRX cycle.

For example, duration x is set, and when the duration within which the DRX of the terminal device is in the long DRX cycle is longer than or equal to x, the configured timer is started.

The duration x may be considered as the preset duration, the duration may be set according to an actual situation, and this is not limited in this embodiment.

Manner 2: Determine to start the timer when a quantity of long DRX cycles that the DRX state of the terminal device is in is greater than a preset quantity.

The quantity of long DRX cycles that the DRX state of the terminal device is in means a quantity of long DRX cycles that the DRX of the terminal device lasts for, and the quantity may be rounded into an integer.

For example, a quantity n is set, and when the quantity of long DRX cycles that the DRX of the terminal device is in is greater than or equal to n, the configured timer is started.

In addition, the preset quantity may be set according to an actual situation, and this is not enumerated in this embodiment.

In step 102, this embodiment may include solutions for different scenarios. For example, in a scenario in which it is determined to switch from the currently activated first BWP to the second BWP if the timer expires, descriptions are provided above, and details not described herein again. In another scenario, that is, a scenario including the DRX state, the determining, based on the timer, whether to switch from a currently activated first bandwidth part BWP to a second BWP includes: if the time expires, determining to switch from the currently activated first BWP to the second BWP if the terminal device is in the long DRX cycle.

It should be noted that when determining to switch from the currently activated first BWP to the second BWP, other than performing BWP switching, the terminal device may alternatively deactivate a first DRX configuration corresponding to the first BWP, and activate a second DRX configuration corresponding to the second BWP when activating the second BWP. A DRX configuration may include a DRX cycle including a time period needed for monitoring and a possible time period for entering DRX, and this is not enumerated in this embodiment.

Specifically, after the timer starts and if the timer expires, if the terminal device is still in the long DRX cycle, the terminal device switches from the currently activated first BWP to the second BWP.

It should be understood that the duration of the timer may be configured by the network side.

Further, the timer is stopped if the terminal device is no longer in the long DRX cycle before the timer expires. That is, after the timer starts and before the timer expires, if the terminal device is no longer in the long DRX cycle, the timer is stopped till it is started again.

A case for stopping the timer includes: stopping the timer when the terminal device is no longer in the long DRX cycle, where the timer stops timing no matter how long the duration of the timer is.

Alternatively, a RACH process may be initiated in the first BWP. In this case, the timer is stopped even if the duration of the timer does not end.

Alternatively, when the network side requires that the terminal device switch from a DRX to a new DRX, the terminal device switches to a timer corresponding to the new DRX.

It should further be noted that the second BWP is a default BWP configured by a network, or a BWP that is not the first BWP and that is reactivated by the terminal device. That is, another configured bandwidth part (BWP) may be a default bandwidth part configured by the network, or may be another reactivated bandwidth part. The second BWP may also be a BWP configured for the terminal device by the network side. The second BWP may be the same as or different from the first BWP. For example, the second BWP and the first BWP may have a same frequency and bandwidth, or different frequencies but a same bandwidth, or a same frequency but different bandwidths, or different frequencies and bandwidths.

It should further be understood that the terminal device may configure two or more BWPs. Based on the solution provided in this embodiment, the currently activated BWP may be referred to as the first BWP, and a to-be-selected BWP is referred to as the second BWP. If more BWPs exist, the foregoing processing solution is also used. For example, the second BWP is activated currently. In this case, the second BWP is used as the first BWP to perform the foregoing steps. If the timer expires and the first BWP is switched to the second BWP, the second BWP may be a third BWP that is different from the foregoing plurality of BWPs, and by analogy.

The second BWP is configured by the network, and the network side may perform determining by invoking uplink data of the terminal device. For example, if the uplink data of the terminal device is sensitive to a time delay, a BWP having a relatively large bandwidth may be selected as the second BWP. Otherwise, a BWP having a relatively small bandwidth may be selected as the second BWP.

A condition that the terminal device is in the long DRX cycle may include at least one of the following:

long DRX command MAC control element is used for control (that is, Long DRX Command MAC control element control);

a DRX short cycle timer drxShortCycleTimer) is enabled;

a DRX-inactivity timer (drx-InactivityTimer) is enabled; and a long DRX command MAC control element (DRX Command MAC control element) is received while the network does not configure a short DRX cycle for the terminal device.

A condition that the terminal device is not in the long DRX cycle may include at least one of the following:

a DRX-inactivity timer (drx-InactivityTime is enabled and a short DRX cycle is configured; and a DRX Command MAC control element is received and the short DRX cycle is configured.

Through the foregoing solution, the timer can be used to control whether to switch from a BWP to another BWP. In this way, BWP switching is implemented, transmission of control information on the network side can be reduced as much as possible, thereby ensuring processing efficiency.

Embodiment 2

Figure 2:
FIG. 2 is a schematic composition diagram of a structure of a terminal device according to an embodiment of the present invention.

This embodiment of the present invention provides a terminal device, as shown in FIG. 2, including:

an information obtaining unit 21, configured to obtain a timer; and a processing unit 22, configured to determine, based on the timer, whether to switch from a currently activated first bandwidth part BWP to a second BWP, where the first BWP is not the second BWP.

The BWP herein mainly includes three parameters: numerology, used to indicate a basic parameter set and a subcarrier spacing SCS; a center frequency; and a bandwidth, which is less than or equal to a maximum system bandwidth.

It can be learned from this that the BWP is a concept in a frequency-domain dimension. In current discussions, it is assumed that a terminal device supports only one activated BWP at onetime point. Said activated means that the terminal device is expected to receive a signal on a bandwidth stipulated by the BWP, including data transmission (uplink and downlink transmission) and a system message.

The information obtaining unit may be a timer defaulted by the terminal device or a timer configured for the terminal device by a user, and certainly may further obtain the timer configured for the terminal device by a network side.

The configuring, by a network side, the timer for the terminal device may be: configuring, by the network side, the timer for the terminal device when it is determined that the terminal device supports only a part of a bandwidth, or that the terminal device uses a BWP for communication. In addition, the network side may configure a same timer or different timers for different terminal devices, and determine based on a type of a service to be executed by the terminal device. For example, a wide BWP may be configured when the service needing to be executed by the terminal device has a relatively high transmission rate or the service has relatively much transmission data. The type of the service can be determined based on parameters such as QoS. It should be understood that another manner to determine the BWP may exist as well, and is not enumerated in this embodiment.

A function of the tuner includes determining, after the timer is started and when the timer is stopped, to perform an operation of switching from the currently activated first bandwidth part BWP to the second BWP. That is, the terminal device determines, according to the configured timer, whether to switch from a currently activated bandwidth part (BWP) to another configured bandwidth part.

In addition, the processing unit determines whether to start the timer. A method for determining whether to start the timer may further include one of the following steps:

starting the timer when the terminal device transmits a PUSCH;

starting the timer when radio resource control (RRC) signaling is transmitted;

starting the timer when the terminal device initiates random access successfully;

starting the timer when downlink control information is received and uplink and downlink transmission is scheduled by using the downlink control information, where the downlink control information may be DCI; and starting the timer when the terminal device sends or receives data on a resource configured for the terminal device by the network side.

The terminal device determines to switch from the currently activated first BWP to the second BWP if the timer expires. The second BWP may also be a BWP configured for the terminal device by the network side. The second. BWP may be the same as or different from the first BWP. For example, the second BWP and the first BWP may have a same frequency and bandwidth, or different frequencies but a same bandwidth, or a same frequency but different bandwidths, or different frequencies and bandwidths. Alternatively, the second BWP and the first BWP may have a same frequency and bandwidth, but the two BWPs correspond to different basic parameter sets (numerology).

That is, when the terminal device uses a BWP to transmit a service, resources may be wasted if no service data is sent or received within a relatively long time. Therefore, according to the solution provided by this embodiment, a timer for the BWP is added, so that BWP switching is performed if the timer expires. For example, when the first BWP has a relatively large bandwidth, resources may be wasted if no service data is transmitted within a long time. Through controlling the timer, the terminal device can switch to another BWP, thereby avoiding a transmission resource waste caused by the network side instructing the terminal device to switch the BWP, and preventing the terminal device from occupying a bandwidth resource for a long time.

In addition, the determining whether to start the timer may be combined with a DRX state for subsequent processing. For example, specifically, whether to start the timer is determined based on duration of the discontinuous reception (DRX) state of the terminal device and a long DRX cycle.

The DRX state of the terminal device may be configured for the terminal device by the network side, so that UE does not need to enter an idle mode when there is no data to transmit, and still remains a synchronization with a base station.

It should be further noted that the following two determination manners may be included:

Manner 1: The processing unit determines to start the timer when duration within which the DRX state of the terminal device is in the long DRX cycle is longer than a preset duration.

In this manner, a start condition of the timer depends on duration within which currently configured DRX is in the long DRX cycle:

For example, duration x is set, and when the duration within which the DRX of the terminal device is in the long DRX cycle is longer than x, the configured timer is started.

The duration x may be considered as the preset duration, the duration may be set according to an actual situation, and this is not limited in this embodiment.

Manner 2: The processing unit determines to start the timer when a quantity of long DRX cycles that the DRX state of the terminal device is in is greater than a preset quantity.

The quantity of long DRX cycles that the DRX state of the terminal device is in means a quantity of long DRX cycles that the DRX of the terminal device lasts for, and the quantity may be rounded into an integer.

For example, a quantity n is set, and when the quantity of long DRX cycles that the DRX of the terminal device is in is greater than or equal to n, the configured timer is started.

In addition, the preset quantity may be set according to an actual situation, and this is not enumerated in this embodiment.

This embodiment may include solutions for different scenarios. For example, in a scenario in which it is determined to switch from the currently activated first BWP to the second BWP if the timer expires, descriptions are provided above, and details are not described herein again. In another scenario, that is, a scenario including the DRX state, if the timer expires, the processing unit determines to switch from the currently activated first BWP to the second BWP.

It should be noted that when determining to switch from the currently activated first BWP to the second BWP, other than performing BWP switching, the terminal device may alternatively deactivate a first DRX configuration corresponding to the first BWP, and activate a second DRX configuration corresponding to the second BWP when activating the second BWP. A DRX configuration may include a DRX cycle including a time period needed for monitoring and a possible time period for entering DRX, and this is not enumerated in this embodiment.

Specifically, after the timer starts and if the timer expires, if the terminal device is still in the long DRX cycle, the terminal device switches from the currently activated first BWP to the second BWP.

It should be understood that the duration of the timer may be configured by the network side.

Further, the timer is stopped if the terminal device is no longer in the long DRX cycle before the timer expires. That is, after the timer starts, and before the timer expires, if the terminal device is no longer in the long DRX cycle, the timer is stopped till it is started again.

A case for stopping the timer includes: stopping the timer when the terminal device is no longer in the long DRX cycle, where the timer stops timing no matter how long the duration of the timer is.

Alternatively, a RACH process may be initiated in the first BWP. In this case, the timer is stopped even if the duration of the timer does not end.

Alternatively, when the network side requires that the terminal device switch from a DRX to a new DRX, the terminal device switches to a timer corresponding to the new DRX.

It should further be noted that the second BWP is a default BWP configured by a network, or a BWP that is not the first BWP and that is reactivated by the terminal device. That is, the other configured bandwidth part (BWP) may be a default bandwidth part configured by the network, or may be another reactivated bandwidth part.

The second BWP may also be a BWP configured for the terminal device by the network side. The second BWP may be the same as or different from the first BWP. For example, the second BWP and the first BWP may have a same frequency and bandwidth, or different frequencies but a same bandwidth, or a same frequency but different bandwidths, or different frequencies and bandwidths.

It should further be understood that the terminal device may configure two or more BWPs. Based on the solution provided in this embodiment, the currently activated BWP may be referred to as the first BWP, and a to-be-selected BWP is referred to as the second BWP. If more BWPs exist, the foregoing processing solution is also used. For example, the second BWP is activated currently. In this case, the second BWP is used as the first BWP to perform the foregoing steps. If the timer expires and the first BWP is switched to the second BWP, the second BWP may be a third BWP that is different from the foregoing plurality of BWPs, and by analogy.

The second BWP is configured by the network, and the network side may perform determining by invoking uplink data of the terminal device. For example, if the uplink data of the terminal device is sensitive to a time delay, a BWP having a relatively large bandwidth may be selected as the second BWP. Otherwise, a BWP having a relatively small bandwidth may be selected as the second BWP.

A condition that the terminal device is in the long DRX cycle may include at least one of the following:

a long DRX command MAC control element is used for control (that is, Long DRX Command MAC control element control);

a DRX short cycle timer (drxShortCycleTimer) is enabled;

a DRX-inactivity timer (drx-InactivitvTimer) is enabled; and a long DRX command MAC control element (DRX Command MAC control element) is received while the network does not configure a short DRX cycle for the terminal device.

A condition that the terminal device is not in the long DRX cycle may include at least one of the following:

a DRX-inactivity timer (drx-InactivityTimer) is enabled and a short DRX cycle is configured; and a DRX Command MAC control element is received and the short DRX cycle is configured.

Through the foregoing solution, the timer can be used to control whether to switch from a BWP to another BWP. In this way, BWP switching is implemented, transmission of control information on the network side can be reduced as much as possible, thereby ensuring processing efficiency.

Figure 3:
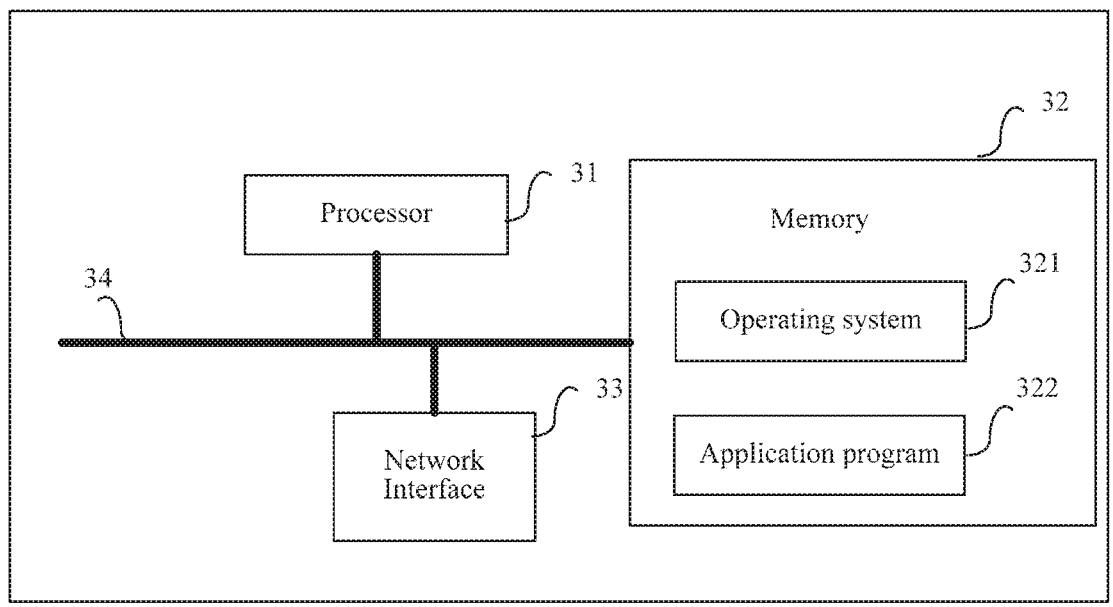
FIG. 3 is a schematic diagram of a hardware architecture according to an embodiment of the present invention.

An embodiment of the present invention further provides a hardware composition architecture of a terminal device, as shown in FIG. 3, including at least one processor 31, a memory 32, and at least one network interface 33. Various components are coupled with each other by using a bus system 34. It can be understood that the bus system 34 is configured to implement connection and communication between these components. In addition to a data bus, the bus system 34 further includes a power bus, a control bus, and a state signal bus. However, for clear description, various buses in FIG. 3 are denoted as the bus system 34.

It should be understood that the memory 32 in this embodiment of the present invention may be a volatile memory or a non-volatile memory, or may include both a volatile memory and a non-volatile memory.

In some corresponding implementations, the memory 32 stores the following elements, executable modules, or data structures, or their subsets, or their extension sets:

an operating system 321 and an application program 322.

The processor 31 is configured to: process the steps of the method in Embodiment 1, and details are not described herein again.

An embodiment of the present invention provides a computer storage medium storing a computer executable instruction. When being executed, the computer executable instruction implements the steps of the method in Embodiment 1.

The foregoing apparatus in the embodiments of the present invention may also be stored in a computer readable storage medium when being implemented in a form of a software functional module and sold or used as an independent product. Based on such understanding, the technical solution of the embodiments of the present invention substantially or a part that contributes to the prior art can be embodied in a form of a software product. The computer software product is stored in a storage medium, and includes several instructions for instructing a computer device (which may be a personal computer, a server, a network device or the like) to perform all or a part of the method according to the embodiments of the present invention. The foregoing storage medium includes any medium that can store program code, such as a USB flash drive, a removable hard disk, a read-only memory (ROM), a magnetic disk, or a compact disc. Therefore, the embodiments of the present invention are not limited to any specific combination of hardware and software.

Correspondingly, an embodiment of the present invention further provides a computer storage medium storing a computer program, and the computer program is configured to execute a bandwidth part switching method of the embodiments of the present invention.

Although preferable embodiments of the present invention are disclosed for an exemplary objective, persons skilled in the art understand that improvement, modifications and replacement are possible. Therefore, the scope of the present invention is not limited to the foregoing embodiments.

What is claimed is:

1. A method for bandwidth part (BWP) switching performed by a terminal device, wherein the terminal device is configured with a timer and configured to receive signal on an active BWP, the method comprising:

when the timer expires, determining to switch from the active BWP to a second BWP, wherein the active BWP is not the second BWP;

determining, based on a discontinuous reception (DRX) state of the terminal device and a long DRX cycle, whether to start the timer; and stopping the timer in response to the terminal device no longer performing discontinuous reception according to the long DRX cycle before the timer expires, wherein the determining, based on the DRX state of the terminal device and the long DRX cycle, whether to start the timer comprises:

starting the timer in response to a duration when the terminal device performing discontinuous reception according to the long DRX cycle being longer than a preset duration, or when a number of long DRX cycles is greater than a preset quantity, and wherein the timer is a DRX-inactivity timer;

wherein the determining to switch from the active BWP to a second BWP comprises:

in the long DRX cycle, when the timer expires, determining to switch from the active BWP to the second BWP.

2. The method according to claim 1, further comprising: obtaining the timer configured for the terminal device by network side.

3. The method according to claim 1, wherein the second BWP is a default BWP configured by a network.

4. The method according to claim 1, wherein when the timer expires, determining to switch from the active BWP to a second BWP comprises:

when the timer expires and a default BWP is configured, determining to switch from the active BWP to the default BWP.

5. A terminal device comprising a processor and memory, wherein the terminal device is configured with a timer and configured to receive signal on an active BWP, and the memory is configured to store a plurality of computer programs that, when executed by the processor, cause the terminal device to perform a plurality of operations comprising:

when the timer expires, determining to switch from the active BWP to a second BWP, wherein the active BWP is not the second BWP;

determining, based on a discontinuous reception (DRX) state of the terminal device and a long DRX cycle, whether to start the timer; and stopping the timer in response to the terminal device no longer performing discontinuous reception according to the long DRX cycle before the timer expires, wherein the determining, based on the DRX state of the terminal device and the long DRX cycle, whether to start the timer comprises:

starting the timer in response to a duration when the terminal device performing discontinuous reception according to the long DRX cycle being longer than a preset duration, or when a number of long DRX cycles is greater than a preset quantity, and wherein the timer is a DRX-inactivity timer;

wherein the determining to switch from the active BWP to a second BWP comprises:

in the long DRX cycle, when the timer expires, determining to switch from the active BWP to the second BWP.

6. The terminal device according to claim 5, wherein the plurality of operations further comprise:

obtaining the timer configured for the terminal device by network side.

7. The terminal device according to claim 5, wherein the second BWP is a default BWP configured by a network.

8. The terminal device according to claim 5, wherein when the timer expires, determining to switch from the active BWP to a second BWP comprises:

when the timer expires and a default BWP is configured, determining to switch from the active BWP to the default BWP.

* * * * *